United States Patent [19]
Groves

[11] Patent Number: 6,101,822
[45] Date of Patent: Aug. 15, 2000

[54] CONSTANT VOLUME AIR CONDITIONING/ HEAT PUMP EFFICIENCY IMPROVEMENT APPARATUS

[76] Inventor: Eugene Groves, 747 Longvue Dr., Wintersville, Ohio 43953

[21] Appl. No.: 09/388,302

[22] Filed: Sep. 1, 1999

[51] Int. Cl.[7] .................................................. F25B 45/00
[52] U.S. Cl. ............................................. 62/149; 62/174
[58] Field of Search ............................. 62/149, 174, 158, 62/159, 160, 216, 222, 224, 225, 217

[56] References Cited

U.S. PATENT DOCUMENTS

| | | | |
|---|---|---|---|
| 2,715,317 | 8/1955 | Rhodes | 62/149 |
| 3,237,422 | 3/1966 | Pugh | 62/149 |
| 3,264,838 | 8/1966 | Johnson | 62/149 |
| 3,736,763 | 6/1973 | Garland | 62/174 X |
| 4,182,406 | 1/1980 | Holbrook et al. | 165/48 |
| 4,365,482 | 12/1982 | Långgård et al. | 62/174 X |
| 4,365,619 | 12/1982 | Holbrook et al. | 126/428 |
| 4,491,061 | 1/1985 | Nishizawa et al. | 417/286 X |
| 4,583,365 | 4/1986 | John | 60/531 |
| 4,959,970 | 10/1990 | Meckler | 62/176.1 |
| 5,239,833 | 8/1993 | Fineblum | 62/401 X |
| 5,597,354 | 1/1997 | Janu et al. | 454/229 |
| 5,601,071 | 2/1997 | Carr et al. | 431/20 X |
| 5,799,497 | 9/1998 | Sano et al. | 62/149 |
| 5,819,721 | 10/1998 | Carr et al. | 431/20 X |

Primary Examiner—Harry B. Tanner
Attorney, Agent, or Firm—John D. Gugliotta

[57] ABSTRACT

The invention is a device to maintain a continuous volume and pressure in a Freon (™) operated air conditioning unit. Outside ambient temperature is used as a baseline for the on/off switch. Vital components include a 110 volt to 24 volt transformer, a pair of electromechanical operated solenoid valve, a pressure and volume gauge, a compressor, and a timer. All devices are connected to a Freon tank-operated air conditioning unit and can be instituted into either enclosed structure or automotive air conditioning systems.

8 Claims, 4 Drawing Sheets

CONSTANT VOLUME AIR CONDITIONING/ HEAT PUMP EFFICIENCY IMPROVEMENT APPARATUS

RELATED APPLICATIONS

The present invention was first described in Disclosure Document Number 452275 filed on Mar. 2, 1999. There are no previously filed, nor currently any co-pending applications, anywhere in the world.

BACKGROUND OF THE INVENTION

1. Field of the Invention

The present invention relates generally to heat pumps and air conditioners and, more particularly, to an apparatus for making heat pumps and air conditioning systems more efficient.

2. Description of the Related Art

In the related art, systems for regulating the temperature inside of homes buildings, and automobiles are well known. Typically, systems for heating include systems which utilize natural gas, propane, LP, electric, coal, and fuel oil as the source of energy which is converted to heat by a furnace and forced via ducting into rooms throughout the structure. There are relatively fewer methods whereby structures are cooled because the heat within in the structure must be removed and then vented somewhere else. Air conditioning systems powered chiefly by electricity have been developed whereby the heat within a room is removed via a refrigerant pressurized and pumped through an exchanger such that when warmer room is blown past it absorbs the heat from within the air.

One other popular form of providing heating and cooling functions to homes and other enclosed structures is the use of the heat pump. The heat pump functions like an air conditioner by removing heat from the warmer of either the outside or inside environment. Thus during winter months, heat present on the exterior of a structure is removed and distributed inside the structure. Likewise, during the warm summer months, heat inside the home is removed and redirected outside. In this manner, the home interior is provided with a comfortable temperature and humidity all year long. The heat pump accomplishes this through the use of Freon or other refrigerant undergoing compression and expansion cycles. However, the heat pump system runs at optimum performance under these two situations when the volume and pressure of the Freon (™)is held constant. Temperature differentials during the two seasons prevent this from happening in a sealed system. An obvious work around to this dilemma is to pressurize the system during one season and reduce the pressure in the other by removing some of the refrigerant and storing it in a separate tank. However, this method has two disadvantages. First the services of an HVAC technician would be required twice a year which results in a service call billing. Second, during the time between the change of seasons, heating may be required during one part of the day and cooling during another part. Accordingly, there is a need for a means by Freon (™) or other refrigerant can easily be automatically added or removed from a heat pump system to allow for optimum operating efficiency. The development of the Constant Volume Air Conditioning/Heat Pump Efficiency Improvement Apparatus fulfills this need.

A search of the prior art did not disclose any patents that read directly on the claims of the instant invention; however, the following references were considered related:

| U.S. Pat. No. | Inventor | Issue Date |
|---|---|---|
| 5,597,354 | Janu et al. | January 28, 1997 |
| 4,959,970 | Meckler | October 2, 1990 |
| 5,819,721 | Carr et al. | October 13, 1998 |
| 5,601,071 | Carr et al. | February 11, 1997 |
| 5,239,833 | Fineblum | August 31, 1993 |
| 4,583,365 | John | April 22, 1986 |
| 4,491,061 | Nishizawa et al. | January 1, 1985 |
| 4,365,619 | Holbrook et al. | December 28, 1982 |
| 4,182,406 | Holbrook et al. | January 8, 1980 |

SUMMARY OF THE INVENTION

It is therefore an object of the present invention to provide a Constant Volume Air Conditioning/Heat Pump Efficiency Improvement Apparatus.

It is a feature of the present invention to reduce wear and tear on a heat pump system and compressor.

It is another feature of the present invention to conserve energy, improve thermal efficiency, and save money.

It is yet another feature of the present invention to be easy to manufacture, made from readily available materials, and be low cost.

It is still yet another feature to be manufactured to retrofit all enclosed structure, portable, and automotive air conditioning systems.

Briefly described according to one embodiment of the present invention, a Constant Volume Air Conditioning/Heat Pump Efficiency Improvement Apparatus is provided comprising a 120 volt to 24 volt transformer, a pair of pressure controlled electromechanical solenoid operated valves, a pressure and volume gauge, a timer and associated interconnecting tubing and devices. All devices are connected to a Freon (™) tank-operated air-conditioning unit. During times that changes to the pressure and volume are necessary, the system of pressure switches then activate the electromechanical solenoid valves and allow excess Freon (™) to exit to a storage tank. The system also functions in a reverse manner by allowing Freon (™) to be drawn out of the tank as well. As a result, use of the Constant Volume Air Conditioning/Heat Pump Efficiency Improvement Apparatus allows one to adjust the pressure and volume of the Freon (™) in their heat pump system to provide optimum efficiency, thus saving money and allow conditioning of their home in a convenient yet effective manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

LIST OF REFERENCE NUMBERS

| | |
|---|---|
| 1 | Compressor |
| 2 | Reversing Valve |
| 3 | Fan |
| 4 | Coil |
| 5 | Liquid Refrigerant Line |
| 6 | Metering Valve |
| 7 | Coil |
| 8 | Low Pressure Line |
| 9 | High Pressure Line |
| 10 | Conventional Refrigeration Cooling Cycle |
| 20 | Constant Volume Air Conditioning/Heat Pump Efficiency Improvement Apparatus |
| 20a | Housing |
| 20b | Housing Cover |
| 20c | Manifold Piping |
| 20d | Timer |
| 20e | Transformer |
| 20f | Junction Box |
| 20g | Bus |
| 20h | Pressure Switch |
| 20i | First Solenoid Valve |
| 20k | Second Solenoid Valve |
| 20l | Piping |
| 20m | Piping |
| 20n | Pressure Gauge |
| 20o | Piping |
| 25 | Refrigerant Reservoir |
| 25a | Heating Coil |
| 25b | Nipple |
| 25c | Quick Connect Coupling |

DESCRIPTION OF THE PREFERRED EMBODIMENTS

The best mode for carrying out the invention is presented in terms of its erred embodiment, herein depicted within the Figures.

1. Detailed Description of the Figures

Figure 1:
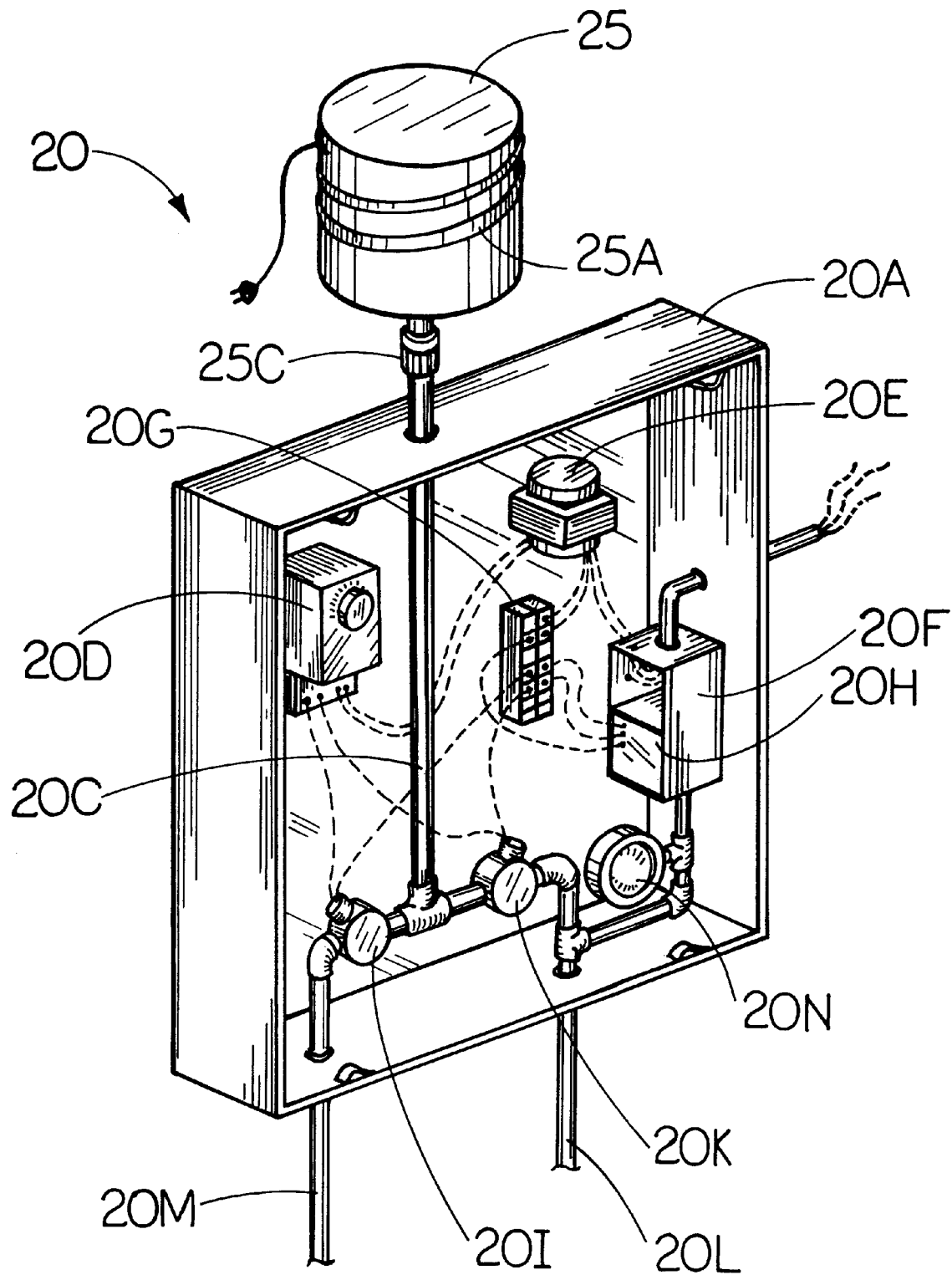
FIG. 1 is a perspective view of a Constant Volume Air Conditioning/Heat Pump Efficiency Improvement Apparatus, according to the preferred embodiment of the present invention.

Referring now to FIG. 1, a Constant Volume Air Conditioning/Heat Pump Efficiency Improvement Apparatus 20 is shown, according to the present invention, for installation in a home or office building having a heat pump/air conditioning system. It is envisioned that a Constant Volume Air Conditioning/Heat Pump Efficiency Improvement Apparatus 20 would be marketed and packaged as a kit for aftermarket installation by qualified professionals or could be made an integral part of a heat pump/air conditioning system at the factory. For purposes of disclosure, the aftermarket version is discussed. Also, it is envisioned that a Constant Volume Air Conditioning/Heat Pump Efficiency Improvement Apparatus 20 could be adapted for use in any environment that uses a heat pump/air conditioning type cooling system such as automobiles, airplanes, buses and trucks. It is stressed that this teaching implies no limitation on the possible application on the possible uses of the present invention.

Figure 2:
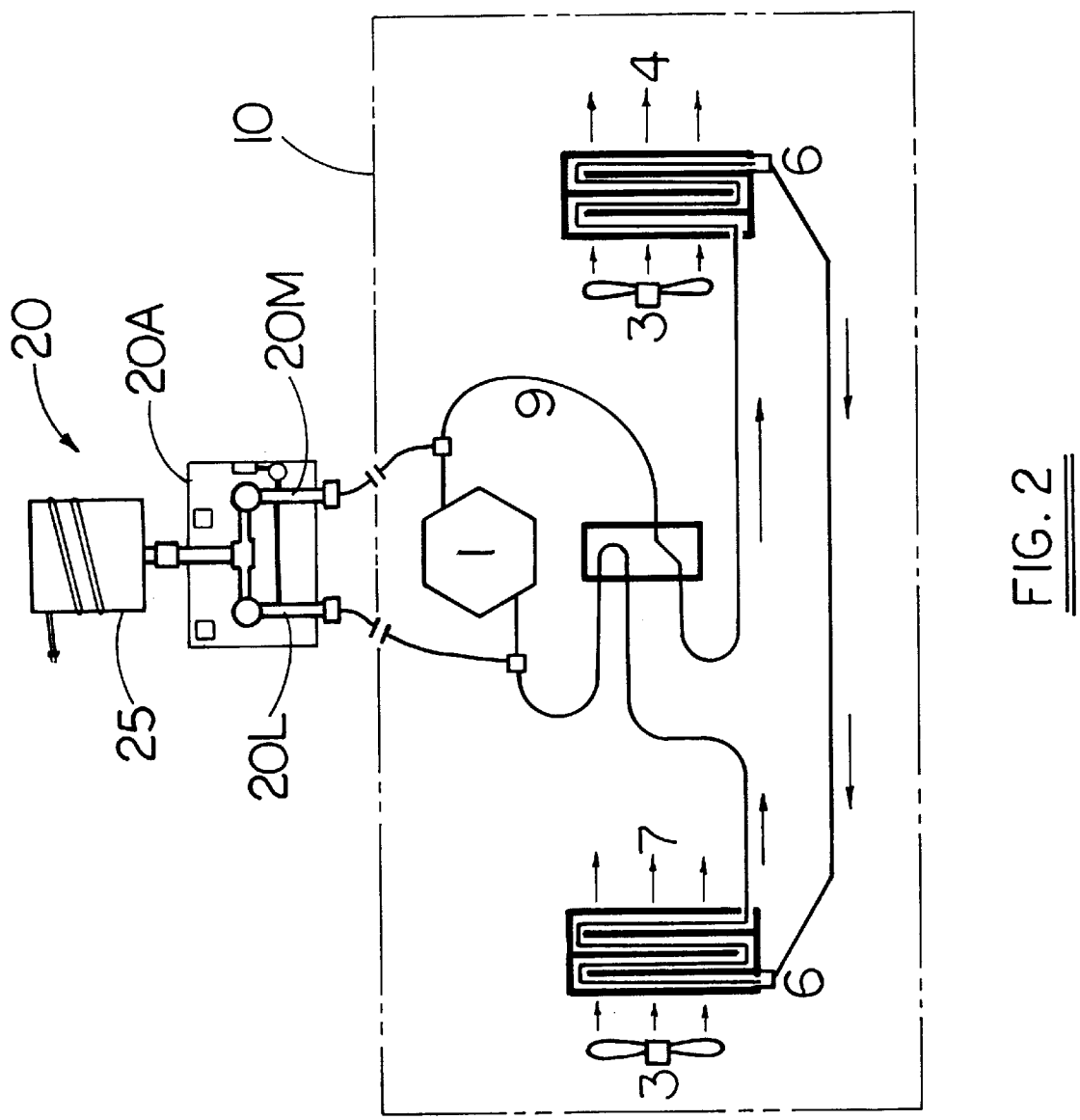
FIG. 2 is a functional schematic diagram of a conventional heat pump/air conditioning cycle configured in the cooling mode to remove heat from inside of a structure and transfer it to the ambient air with a Constant Volume Air Conditioning/Heat Pump Efficiency Improvement Apparatus, according to the preferred embodiment of the present invention.

Referring to FIG. 2, a front view of a Constant Volume Air Conditioning/Heat Pump Efficiency Improvement Apparatus 20 is shown connected to an otherwise conventional heat pump/air conditioning system 10 via piping 201 and 20m. Piping 201 is connected to system piping 8 on the low pressure side of compressor 1 while piping 20m is connected to system piping 9 on the high pressure side of compressor 1. FIG. 2 shows the direction of flow of Freon (™) in system 10 when it is in the cooling mode. As is well know, a heat pump/air conditioning system has two modes. In the cooling mode, heat is removed from within a structure and transferred to the atmosphere. The other mode reverses this cycle by removing heat from the atmosphere and transferring it to the structure to heat it. The Constant Volume Air Conditioning/Heat Pump Efficiency Improvement Apparatus 20 works with both modes increasing the thermal efficiency therein. The distinctions on how the Constant Volume Air Conditioning/Heat Pump Efficiency Improvement Apparatus 20 works in both modes will be explained further herein.

The basic theory behind how the Constant Volume Air Conditioning/Heat Pump Efficiency Improvement Apparatus 20 works and why it increases the thermal efficiency of the heat pump/air conditioning cycle requires an explanation on how the refrigeration/cooling cycle works. Basically, it is a sealed system composed of copper tubing, some electronics, and three basic components: a compressor, a condenser, and an evaporator. The compressor 1 compresses a refrigerant, typically Freon (™), into high pressure vapor. The refrigerant vapor enters the outside coil 2 (condenser) where a fan blows air across it. This condenses the refrigerant into a liquid by cooling it and removing the latent heat of vaporization. The refrigerant which is now liquid is pushed along the refrigerant line to the inside coil (evaporator) 7 where it encounters a metering device . The metering device 6 limits the amount of refrigerant entering the inside coil (evaporator) and creates a pressure drop across it. This allows the refrigerant to expand from a small diameter tube to a larger one. At this coil, a fan 3 blows air across it and the refrigerant absorbs the heat in the air regaining the previously lost latent heat of vaporization. This effectively cools the air exiting the coil 7 and the heat evaporates the refrigerant back to vapor. From here the refrigerant vapor returns to the compressor 1 to start the cycle over again.

What is inherent in the foregoing is that as the refrigerant moves from one point in the cycle to another its temperature and pressure vary as does the volume of that point in the system. It is generally known that temperature, pressure, and volume are inversely proportional. When the system is initially charged with refrigerant it is pressurized to a pressure that is deemed optimal. But this only takes into consideration the pressure at the time of pressurization since the pressure will fluctuate with temperature. For example, the initial internal pressure in the system when pressurized on a 85° C. day will not be the same as the initial internal pressure if pressurized on a 60° C. day. So as the ambient temperature fluctuates the internal pressure of the system fluctuates somewhat as well so that the system does not operate at the optimum pressures throughout if the ambient temperature is not the same as at the time it was pressurized.

The theory behind the present invention is to maintain the optimum operating pressure in the heat pump/air conditioning cooling cycle by monitoring the internal pressure of the refrigerant and either adding or removing refrigerant to maintain a constant volume and hence pressure throughout the system. As previously discussed, refrigerant is either added or removed from the cooling cycle via piping 20*l* and 20*m* tapped onto the low and high pressure lines respectively, on the both sides of compressor 1. Piping 20*l* and 20*m* are routed into a housing 20*a* and are connected on one side of and terminate at first solenoid valve 20*k* and second solenoid valve 20*i*, respectively, which control the flow of refrigerant into or out of the system. Housing 20*a* contains the majority of the components of the apparatus 20. Housing 20*a* is designed to be mounted on a wall in a utility room where other household appliances such as the furnace or water heater are typically located and is sealed closed by housing cover 20*b*. The other side of first solenoid valve 20*k* and second solenoid valve 20*i* are connected to a common manifold 20*p* which is connected to manifold piping 20*c* connected to refrigerant reservoir 25. Refrigerant reservoir 25 is filled with the same refrigerant as the heat pump/air conditioning system and is for dispensing and receiving refrigerant. Refrigerant reservoir 25 is connected to manifold 20*p* via piping 20*c*. A quick disconnect coupling allows easy removal and attachment refrigerant reservoir 25 to manifold piping 20*c*.

A pressure switch 20*h* is in constant fluid communication with piping 20*l* connected to the low pressure line 8 of the air conditioning and heat pump system 10. In this manner, when pressure in system 10 is higher than optimal, a signal from pressure switch 20*h* will open first solenoid valve 20*i*, normally closed, and refrigerant from the high pressure side of system 10 will flow into refrigerant reservoir 25 until the optimal pressure is achieved. Conversely, when pressure in the system is lower than optimal, a signal from pressure switch 20*h* will open second solenoid valve 20*k*, normally closed, and refrigerant from the low pressure side of the system 10 will flow into refrigerant reservoir 25 until optimal pressure is achieved. A heating coil wrapped around refrigerant reservoir 25 warms the refrigerant therein when it is necessary to raise the total internal pressure of the refrigerant to meet the demands of system 10 when the total internal pressure of system 10 drops significantly.

In order to prevent first solenoid valve 20*i* and second solenoid valve 20*k* from overcycling, in other words, operating for every small fluctuation of system 10 pressure, a timer 20*d* is used to control the amount of time either first solenoid valve 20*i* or second solenoid valve 20*k* is open. When the system 10 pressure drops requiring additional refrigerant to be added to the system 10, timer 20*d* will keep first solenoid valve 20*i* open slightly longer to ensure that more than adequate refrigerant is added to prevent small perturbations in the system 10 pressure from triggering first solenoid valve 20*i*. Similarly, timer 20*d* will keep second solenoid valve 20*k* open slightly longer to ensure that more than adequate refrigerant is added to prevent small perturbations in the system 10 pressure from triggering second solenoid valve 20*k*. Of course, the extra time that timer 20*d* will keep first solenoid valve 20*i* and second solenoid valve 2*k* open is variable and will require adjustment when the Constant Volume Air Conditioning/Heat Pump Efficiency Improvement Apparatus 20 is initially installed. Pressure switch 20*h* also can be variably set to trigger first solenoid valve 20*i* when the system pressure falls below a pre-selected pressure or trigger second solenoid valve 20*k* when the pressure rises above a certain pre-selected pressure.

Also located in housing 20*a* is a transformer 20*e* for converting conventional 120 vac current to 24v dc current for powering first solenoid valve 20*i* and second solenoid valve 20*k*, timer 20*d*, and pressure switch 20*h*. A bus 20*g* and junction box 20*f* is also located therein for distributing power to the various aforementioned components.

Figure 3:
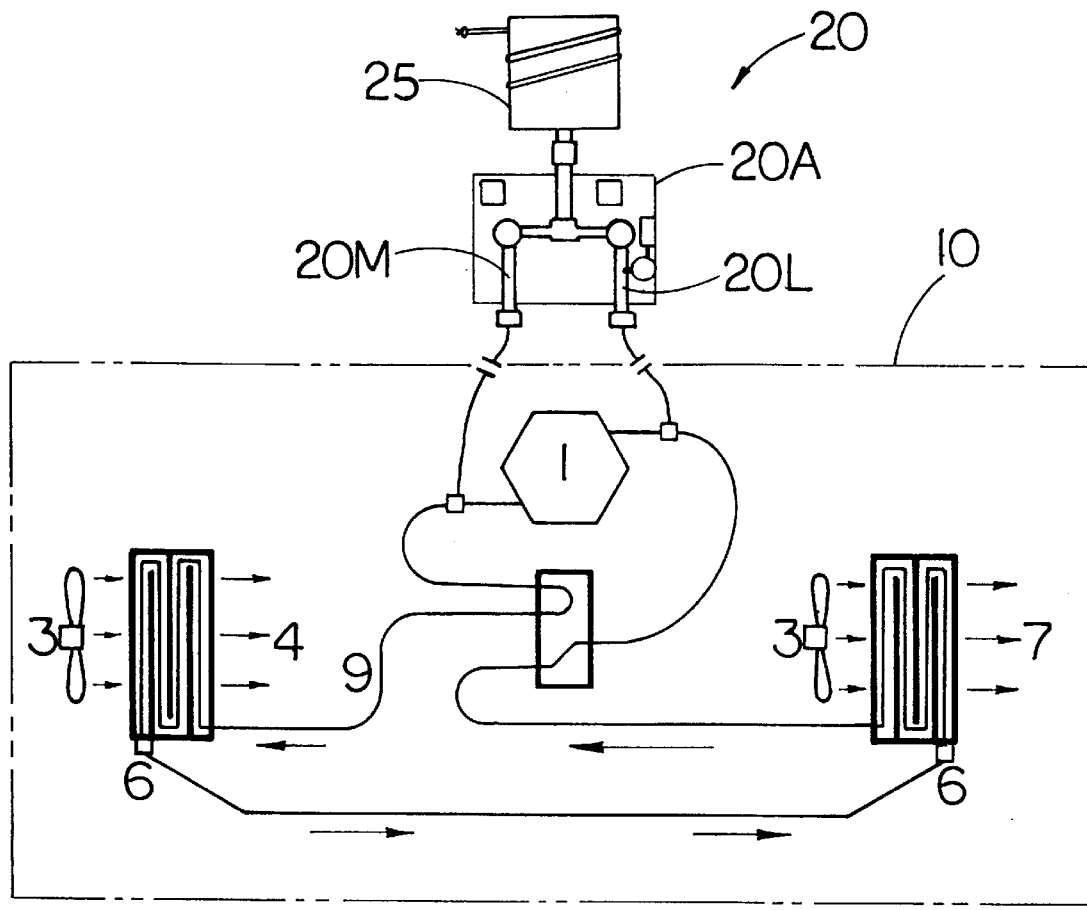
FIG. 3 is a functional schematic diagram of a conventional heat pump configured in the heating mode to remove heat from the ambient air and transfer it to the inside of a structure with a Constant Volume Air Conditioning/Heat Pump Efficiency Improvement Apparatus, according to the preferred embodiment of the present invention.

Referring to FIG. 3, shown is a front view of a Constant Volume Air Conditioning/Heat Pump Efficiency Improvement Apparatus 20 identical to that shown in FIG. 2 in almost all respects except that it is configured for use as a heat pump.

The aim of the heat pump cycle, like that of the refrigeration cycle, is to move heat from one location to another. The only difference is that in the case of the heat pump cycle, the objective is to move the heat from a cool location (outside) to a warmer location (inside). The components are identical in the heat pump cycle, but their location is reversed. That is, the condenser which gives off heat is placed within the space to be heated, and the evaporator is placed outside so that it may pick up heat from the cooler surroundings. The heat pump cycle is far more efficient and cost effective than electric resistance heating common in baseboard and other heating units. In order for heat pumps to work effectively, the outside temperature must be higher than the temperature of the outside heat exchanger. Heat pumps usually do not provide effective heating when the outside temperature is below 45° F. (72° C.). In order for heat pump units to provide year-round functionality, electric resistance heating is often added, for use when the heat pump cycle itself does not provide satisfactory heating.

The difference between FIGS. 2 and 3 is that FIG. 3 shows the heat pump in heat mode. The difference in the two diagrams is the reversing valve 2 directs the compressed refrigerant to the inside coil 4 first. This makes the inside coil the condenser 4 and releases the heat energy. This heated air is ducted to the home or office. The outside coil 7 is used to collect the heat energy. This now becomes the evaporator. A metering valve 6 must also now be located on the inlet to coil 7 on the liquid refrigerant line 5 side to limit the amount of refrigerant flowing into coil 7 and effect the pressure drop as in the cooling cycle.

Figure 4:
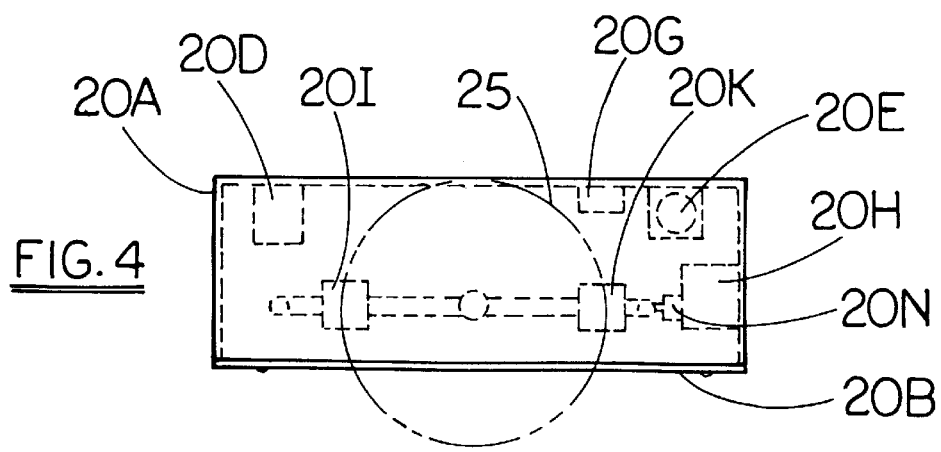
FIG. 4 is a top view of a Constant Volume Air Conditioning/Heat Pump Efficiency Improvement Apparatus, according to the preferred embodiment of the present invention.

Referring to FIG. 4, shown is an enlarged front view of a Constant Volume Air Conditioning/Heat Pump Efficiency Improvement Apparatus 20 showing in greater detail the major components previously described. A pressure gauge 20*n* in fluid communication with the low pressure side piping 20*l* is also located therein to give visual indicia of the internal pressure of the heat pump/air conditioning system 10 to allow adjustment of timer 20*d* and pressure switch 20*h*.

Figure 5:
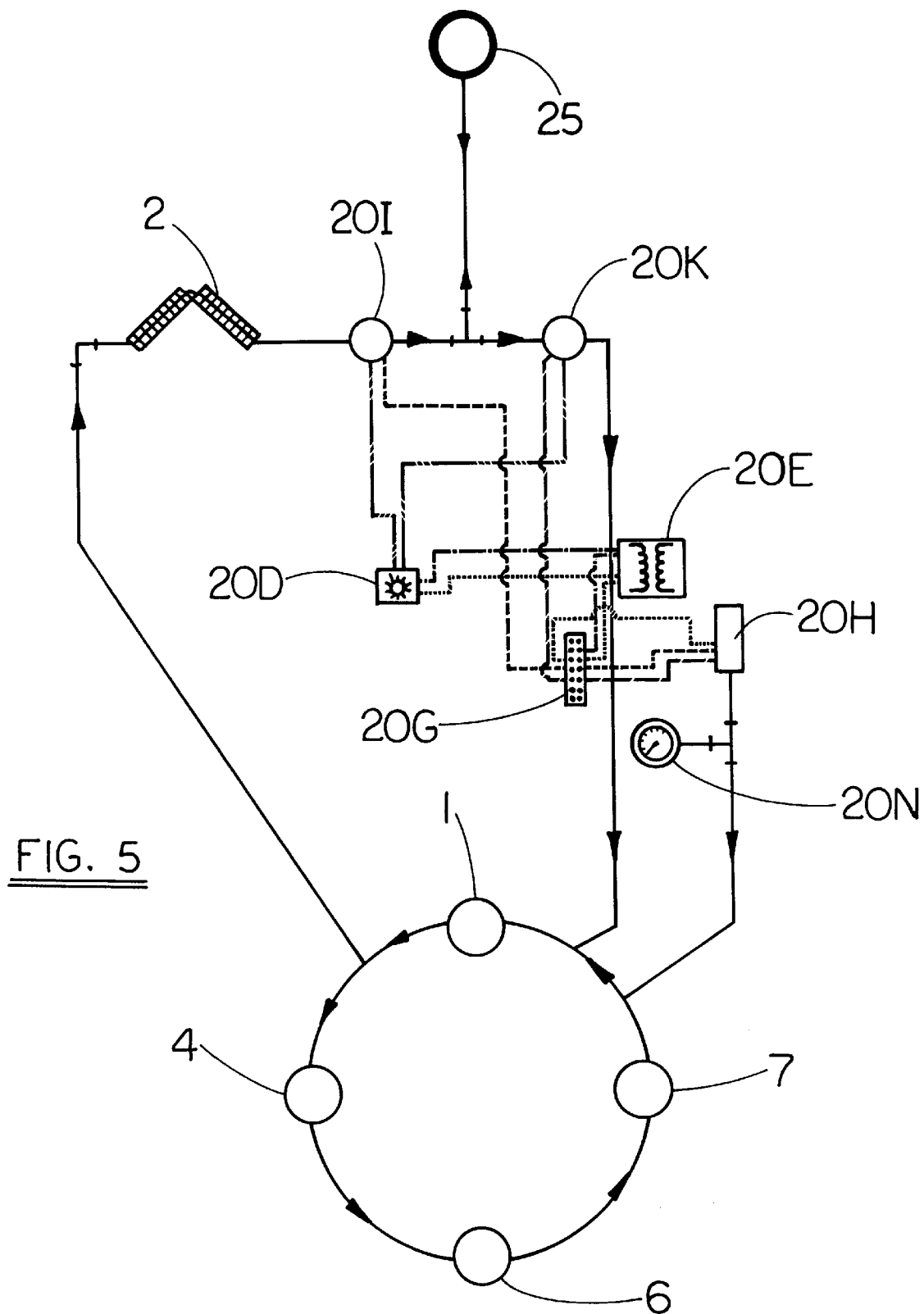
FIG. 5 is a schematic diagram of the refrigerant flow and electrical schematics of a Constant Volume Air Conditioning/Heat Pump Efficiency Improvement Apparatus, according to the preferred embodiment of the present invention.

Referring to FIG. 5, shown are the electrical schematics interconnecting the various electronic components of a Constant Volume Air Conditioning/Heat Pump Efficiency Improvement Apparatus 20, according to a preferred embodiment of the present invention.

The foregoing description is included to illustrate the operation of the preferred embodiment and is not meant to limit the scope of the invention. The scope of the invention is to be limited only by the following claims.

What is claimed is:

1. An apparatus for improving the thermal efficiency of an air conditioning or heat pump system, consisting of:
    refrigerant piping, said refrigerant piping tapped onto the low and high pressure lines on both sides of said air conditioning or heat pump compressor for adding or removing refrigerant to the cooling cycle;
    a refrigerant reservoir, said refrigerant reservoir for receiving and dispensing refrigerant;

a first solenoid valve, said first solenoid valve normally closed and connected on one side to said piping tapped onto said low pressure line of said air conditioning or heat pump compressor to control the flow of refrigerant into or out of said air conditioning or heat pump system;

a second solenoid valve, said second solenoid valve normally closed and connected on one side to said piping tapped onto said high pressure line of said air conditioning or heat pump compressor to control the flow of refrigerant into or out of said air conditioning or heat pump system;

a manifold, said manifold connected to the other side of said first solenoid valve and said second solenoid valve and to manifold piping connected to said refrigerant reservoir;

a first pressure switch, said first pressure being in constant fluid communication with said piping connected to said low pressure side of said air conditioning or heat pump system;

a timer, said timer for preventing said first and second solenoid valves from overcycling;

a transformer, said transformer for converting conventional 120 vac to 24 vdc current for powering said first and second solenoid valve, said timer, and said pressure switch;

a bus, said bus for distributing power to said first and second solenoid valve, said timer, and said pressure switch;

a junction box, said junction box for electrically interconnecting said first and second solenoid valve, said timer, and said pressure switch;

a heating coil, said heating coil for heating said refrigerant reservoir;

a housing, said housing for attachment to a wall containing said first solenoid valve, said second solenoid valve, said timer, said bus, said junction box, said manifold, said pressure switch, and said junction box; and a housing cover, said housing cover for sealing closed said housing.

2. The apparatus for improving the thermal efficiency of an air conditioning or heat pump system of claim 1, wherein when pressure in said system is higher than optimal, a signal from said pressure switch will open said first solenoid valve and refrigerant from said high pressure side of said air conditioning or heat pump system will flow into said refrigerant reservoir until optimal pressure is achieved, and conversely, when pressure in said air conditioning or heat pump system is lower than optimal, a signal from said pressure switch will open said second solenoid valve and refrigerant from said low pressure side of said system will flow into said refrigerant reservoir until optimal pressure is achieved.

3. The apparatus for improving the thermal efficiency of an air conditioning or heat pump system of claim 2, wherein said timer prevents overcycling by keeping said first solenoid valve open slightly longer to ensure that more than adequate refrigerant is added to prevent small perturbations in the said system pressure from triggering first solenoid valve, and said timer will keep said second solenoid valve open slightly longer to ensure that more than adequate refrigerant is added to prevent small perturbations in said system pressure from triggering said second solenoid valve.

4. The apparatus for improving the thermal efficiency of an air conditioning or heat pump system of claim 3, further comprising a quick disconnect coupling allows easy removal and attachment of said refrigerant reservoir to said manifold piping.

5. The apparatus for improving the thermal efficiency of an air conditioning or heat pump system of claim 4, further comprising a heat coil, wherein said heating coil wrapped around said refrigerant reservoir warms the refrigerant therein when it is necessary to raise the total internal pressure of the refrigerant to meet the demands of the said air conditioning or heat pump system when the total internal pressure of said air conditioning or heat pump system drops significantly.

6. The apparatus for improving the thermal efficiency of an air conditioning or heat pump system of claim 5, wherein said pressure switch can be variably set to trigger said first solenoid valve when said air conditioning or heat pump system pressure falls below a pre-selected pressure or trigger said second solenoid valve when the pressure rises above a certain pre-selected pressure.

7. The apparatus for improving the thermal efficiency of an air conditioning or heat pump system of claim 6, further comprising a pressure gage in fluid communication with said low pressure line for monitoring said air conditioning or heat pump system pressure.

8. The apparatus for improving the thermal efficiency of an air conditioning or heat pump system of claim 7, wherein said apparatus is available as an aftermarket kit or as an integral part of an air conditioning and heat pump system at the factory.

\* \* \* \* \*